US012617977B2

(12) United States Patent
Ansai et al.

(10) Patent No.: US 12,617,977 B2
(45) Date of Patent: May 5, 2026

(54) PRESSURE SENSITIVE ADHESIVE SHEET FOR BATTERIES AND LITHIUM-ION BATTERY

(71) Applicant: LINTEC CORPORATION, Tokyo (JP)

(72) Inventors: Takeshi Ansai, Tokyo (JP); Yuichi Kurata, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 452 days.

(21) Appl. No.: 16/574,258

(22) Filed: Sep. 18, 2019

(65) Prior Publication Data

US 2020/0087545 A1 Mar. 19, 2020

(30) Foreign Application Priority Data

Sep. 19, 2018 (JP) ................................. 2018-175304

(51) Int. Cl.
| | |
|---|---|
| *C09J 7/38* | (2018.01) |
| *H01M 10/052* | (2010.01) |
| *H01M 50/46* | (2021.01) |
| *H01M 50/171* | (2021.01) |
| *H01M 50/534* | (2021.01) |
| *H01M 50/536* | (2021.01) |
| *H01M 50/538* | (2021.01) |

(52) U.S. Cl.
CPC ............. *C09J 7/38* (2018.01); *H01M 10/052* (2013.01); *H01M 50/46* (2021.01); *H01M 50/171* (2021.01); *H01M 50/461* (2021.01); *H01M 50/534* (2021.01); *H01M 50/536* (2021.01); *H01M 50/538* (2021.01); *Y10T 428/1476* (2015.01); *Y10T 428/28* (2015.01); *Y10T 428/2848* (2015.01); *Y10T 428/2891* (2015.01)

(58) Field of Classification Search
None
See application file for complete search history.

(56) References Cited

U.S. PATENT DOCUMENTS

| | | | | |
|---|---|---|---|---|
| 10,550,289 B2 * | 2/2020 | Kurata | ................. | C09D 135/02 |
| 10,633,562 B2 * | 4/2020 | Kurata | ................... | B32B 27/00 |
| 2007/0267133 A1 * | 11/2007 | Matano | ................. | C09J 133/02 |
| | | | | 528/44 |
| 2011/0217577 A1 * | 9/2011 | Fukui | ................. | H01M 10/052 |
| | | | | 429/94 |
| 2012/0301716 A1 * | 11/2012 | Terada | ....................... | C09J 7/10 |
| | | | | 428/355 AC |
| 2016/0152872 A1 * | 6/2016 | Furuta | ........................ | C09J 7/38 |
| | | | | 252/75 |
| 2018/0155582 A1 | 6/2018 | Ansai et al. | | |
| 2018/0159136 A1 | 6/2018 | Shiozaki et al. | | |
| 2020/0087546 A1 * | 3/2020 | Ansai | ......................... | C09J 7/38 |
| 2021/0198529 A1 * | 7/2021 | Ansai | ....................... | C09J 7/381 |

FOREIGN PATENT DOCUMENTS

| | | |
|---|---|---|
| CN | 108165194 A | 6/2018 |
| JP | 2017152372 A | 8/2017 |
| JP | 2018-83904 A | 5/2018 |
| JP | 2018-85121 A | 5/2018 |
| JP | 2018-127561 A | 8/2018 |
| WO | 2017/038010 A1 | 3/2017 |

OTHER PUBLICATIONS

Kuramoto et al., "Adhesive Composition, Adhesive Agent, and Adhesive Sheet", machine translation CN106133079 A, Nov. 16, 2016 (Year: 2016).*
English translation of CN106133079A (Year: 2016).*
Office Action for JP App. No. 2018-175304, dated Mar. 15, 2022 (w/ translation).
Office Action for CN App. No. 201910887686.3, dated Nov. 30, 2022 (w/ translation).
Office Action for CN App. No. 201910887686.3, dated Jun. 8, 2022 (w/ translation).

* cited by examiner

*Primary Examiner* — Anish P Desai
(74) *Attorney, Agent, or Firm* — GREENBLUM & BERNSTEIN, P.L.C.

(57) ABSTRACT

A pressure sensitive adhesive sheet for batteries that includes a base material and a pressure sensitive adhesive layer provided on one surface side of the base material and containing inorganic fine particles. The haze value of the pressure sensitive adhesive layer is 50% or more and 85% or less.

7 Claims, 3 Drawing Sheets

PRESSURE SENSITIVE ADHESIVE SHEET FOR BATTERIES AND LITHIUM-ION BATTERY

TECHNICAL FIELD

The present invention relates to a pressure sensitive adhesive sheet for batteries and a lithium-ion battery manufactured using the pressure sensitive adhesive sheet for batteries.

BACKGROUND ART

In some batteries, strip-like laminates are housed inside the batteries in a state of being wound up. Such a laminate is formed by laminating a positive electrode, a negative electrode, and separators located between the positive and negative electrodes. The positive and negative electrodes are connected to respective electrode lead-out tabs of conductors, which electrically connect the positive and negative electrodes respectively to a positive electrode terminal and a negative electrode terminal of the battery.

A pressure sensitive adhesive sheet may be used as a stopper for the above wound-up laminate and/or used for fixation of the electrode lead-out tabs to the electrodes. As such a pressure sensitive adhesive sheet, generally, a sheet composed of a base material and a pressure sensitive adhesive layer provided on one surface of the base material is used. From a viewpoint of improving the desired performance such as insulation properties, a modified pressure sensitive adhesive sheet may be used which is configured such that an insulation layer that contains an insulating material is provided on the surface of the above base material opposite to the above pressure sensitive adhesive layer or between the above base material and the above pressure sensitive adhesive layer.

However, providing the insulation layer, as described above separately from the pressure sensitive adhesive layer may lead to an increase in the manufacturing cost. In this regard, it is also tried to contain an insulating material or the like in the pressure sensitive adhesive layer thereby to improve the insulation properties of the pressure sensitive adhesive sheer, without providing an additional insulation layer, as described above. For example, Patent Document 1 discloses a pressure sensitive adhesive sheet in which the pressure sensitive adhesive layer contains alumina. Patent Document 2 discloses a pressure sensitive adhesive sheet in which the pressure sensitive adhesive layer contains magnesium hydroxide, alumina, magnesium oxide, aluminum hydroxide, silica, boron nitride, titanium oxide, or magnesium carbonate.

PRIOR ART DOCUMENTS

Patent Documents

[Patent Document 1] WO2017/038010
[Patent Document 2] JP2017-152372A

SUMMARY OF THE INVENTION

Problems to be Solved by the Invention

In recent years, as the energy density of batteries such as lithium ion batteries is enhanced, if has become more important than ever to improve the safety of batteries. For example, when foreign materials are mixed inside a battery, an internal short circuit may occur due to the foreign materials, and the battery may generate heat. When manufacturing batteries, therefore, it is important to prevent such foreign materials from being mixed and it is also important to properly find a battery in which foreign materials are mixed and remove the mixed foreign materials or exclude the battery in which foreign materials are mixed.

When manufacturing batteries using the conventional pressure sensitive adhesive sheet, however, if was very difficult to find the foreign materials interposed between the pressure sensitive adhesive sheet and an adherend.

The present invention has been made in consideration of such actual circumstances and an object of the present invention is to provide a pressure sensitive adhesive sheet for batteries that has high insulation properties and allows the foreign materials mixed in a battery to be readily found. Another object of the present invention is to provide a lithium-ion battery m which the pressure sensitive adhesive sheet for batteries is used.

Means for Solving the Problems

To achieve the above objects, first, the present invention provides a pressure sensitive adhesive sheet for batteries, comprising: a base material; and a pressure sensitive adhesive layer provided on one surface side of the base material and containing inorganic fine particles, wherein the hate value of the pressure sensitive adhesive layer is 50% or more and 65% or less (Invention 1).

In the pressure sensitive adhesive sheet for batteries according to the above invention (Invention 1), the pressure sensitive adhesive layer contains inorganic fine particles and the haze value of the pressure sensitive adhesive layer falls within the above-described range, so that the pressure sensitive adhesive sheet for batteries can achieve high insulation properties and allows the foreign materials interposed between the pressure sensitive adhesive sheet for batteries and an adherend to be readily found through the pressure sensitive adhesive sheet for batteries. Thus, the pressure sensitive adhesive sheet for batteries can be used thereby to manufacture highly safe batteries in which foreign materials are suppressed from being mixed in the batteries.

In the above invention (Invention 1), the total luminous transmittance of the pressure sensitive adhesive layer may preferably be 80% or more (Invention 2).

In the above invention (Invention 1, 2), the content of the inorganic fine particles in the pressure sensitive adhesive layer may preferably be 1 vol % or more and 50 vol % or less with respect to the pressure sensitive adhesive layer (Invention 3).

In the above invention (Invention 1 to 3), the thickness of the pressure sensitive adhesive layer may preferably be 1 μm or more and 50 μm or less (Invention 4).

Second, the present invention provides a lithium-ion battery in which two or more conductors are fixed in a state of being m contact with each other inside the battery using the above pressure sensitive adhesive sheet for batteries (Invention 1 to 4) (Invention 5).

Advantageous Effect of the Invention

The pressure sensitive adhesive sheet for batteries according to the present invention has high insular, ion properties and allows the foreign materials mixed in a battery to be readily found. The lithium-ion battery manufactured using the pressure sensitive adhesive sheet for batteries can therefore have high safety.

EMBODIMENTS FOR CARRYING OUT THE INVENTION

Hereinafter, one or more embodiments of the present invention will rce described.

<Pressure Sensitive Adhesive Sheet for Batteries>

Figure 1:
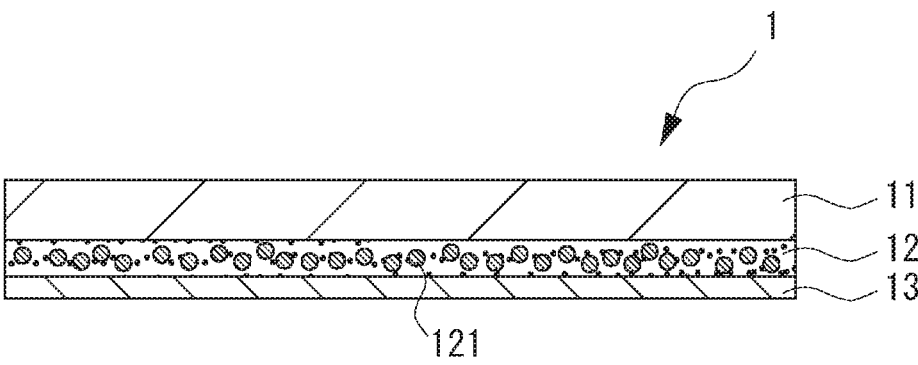
FIG. 1 is a cross-sectional view of a pressure sensitive adhesive sheet for batteries according to an embodiment of the present invention.

As illustrated in FIG. 1, a pressure sensitive adhesive sheet for batteries 1 according to an embodiment of the present invention may be composed of a base material. 11, a pressure sensitive adhesive layer 12 provided on one surface side of the base material 11, and a release sheet 13 provided on the surface side of the pressure sensitive adhesive layer 12 opposite to the base material 11. In the pressure sensitive adhesive sheet for batteries 1 according to the present embodiment, the pressure sensitive adhesive layer 12 contains inorganic fine particles 121.

Here, the "pressure sensitive adhesive sheet for batteries" in the present description is a pressure sensitive adhesive sheet used at a site at which there is a possibility of contact with an electrolyte solution when manufacturing a battery. Preferably, it may be a pressure sensitive adhesive sheet used inside a battery and may also be a pressure sensitive adhesive sheet for battery interior. The battery may preferably be a nonaqueous battery. Accordingly, the electrolyte solution used in the battery may preferably be a nonaqueous electrolyte solution. The pressure sensitive adhesive sheet for batteries in the present description may preferably be a pressure sensitive adhesive sheet that is attached to a site at which there is a possibility of immersion in an electrolyte solution inside a nonaqueous battery or a site at which there is a possibility of contact with an electrolyte solution. A lithium-ion battery may be particularly preferred as the nonaqueous battery.

In the pressure sensitive adhesive sheet for batteries 1 according to the present embodiment, the pressure sensitive adhesive layer 12 contains the inorganic fine particles 121 and can thereby serve as an insulation layer. The pressure sensitive adhesive sheet for batteries 1 according to the present embodiment is therefore excellent in the insulation properties in an ordinary state. Moreover, the pressure sensitive adhesive sheet for batteries 1 according to the present embodiment includes the pressure sensitive adhesive layer 12, and the amount of neat generation can thereby be suppressed to a low value even when the internal short circuit occurs m a battery in which the pressure sensitive adhesive sheet for batteries 1 is used.

In the pressure sensitive adhesive sheet for batteries 1 according to the present embodiment, the haze value of the pressure sensitive adhesive layer 12 is 50% or more and 85% or less, and the pressure sensitive adhesive layer 12 can thereby have appropriate translucency. This allows the presence of foreign materials to be readily found through the pressure sensitive adhesive sheet for batteries 1 even when the foreign materials are interposed between the pressure sensitive adhesive sheet for batteries 1 and an adherend.

According to the pressure sensitive adhesive sheet for batteries 1 of the present embodiment, therefore, a highly safe battery can be manufactured in which foreign materials are not mixed.

If the haze value of the pressure sensitive adhesive layer 12 exceeds 85%, the pressure sensitive adhesive layer 12 will nor have sufficient translucency and it may be difficult to found the foreign materials present between the pressure sensitive adhesive sheet for batteries 1 and an adherend. From this viewpoint, the haze value of the pressure sensitive adhesive layer 12 may foe preferably 82% or less and particularly preferably 78% or less.

If the haze value of the pressure sensitive adhesive layer 12 is less than 50%, the pressure sensitive adhesive layer 12 will not contain a sufficient amount of the inorganic fine particles 121, and the pressure sensitive adhesive sheet for batteries 1 cannot exhibit excellent insulation properties. From this viewpoint, the haze value of the pressure sensitive adhesive layer 12 may be preferably 55% or more and particularly preferably 80% or more. Details of the method of measuring the above haze value are as described in the Testing Example, which will be described later.

In the pressure sensitive adhesive sheet for batteries 1 according to the present embodiment, the total luminous transmittance of the pressure sensitive adhesive layer 12 may be preferably 80% or more, particularly preferably 88% or more, and further preferably 94% or more. When the total luminous transmittance of the pressure sensitive adhesive layer 12 is 80% or more, the pressure sensitive adhesive layer 12 can have setter translucency and allows the foreign materials present between the pressure sensitive adhesive sheet for batteries 1 and an adherend to be further readily found through the pressure sensitive adhesive sheet for batteries 1. On the other hand, the upper limit of the total luminous transmittance of the pressure sensitive adhesive layer 12 is not particularly limited, but may be, for example, 100% or less in an embodiment, 99% or less in another embodiment, and 97% or less in still another embodiment. Details of the method of measuring the above total luminous transmittance are as described in the Testing Example, which will be described later.

1. Constitutional Elements 1-1. Base Material

In the pressure sensitive adhesive sheet for batteries 1 according to the present embodiment, the base material 11 may preferably have excellent translucency. For example, the haze value of the base material 11 may be preferably 30% or less, particularly preferably 20% or less, and further preferably 9% or less. On the other hand, the lower limit of the hate value of the base material 11 is not particularly limited, but may be, for example, 0% or more in an embodiment, 0.1% or more in another embodiment, and 1% or more in still another embodiment. The total luminous transmittance of the base material 11 may be preferably 20% or more, particularly preferably 35% or more, and further preferably 50% or more. On the other hand, the upper limit of the total luminous transmittance of the base material 11 is not particularly limited, but may be, for example, 100% or less in an embodiment, 30% or less in another embodiment, and 60% or less in still another embodiment. In the pressure sensitive adhesive sheet for batteries 1 according to the present embodiment, the pressure sensitive adhesive layer 12 has excellent translucency as previously described and, therefore, the base material 11 having excellent translucency allows the foreign materials present between the pressure sensitive adhesive sheet for batteries 1 and an adherend to be further readily found through the pressure sensitive adhesive sheet for batteries 1. Details of the methods of measuring the above-described haze value and total luminous transmittance of the base material 11 are as described in the Testing Example, which will be described later.

The base material 11 may preferably have a high minimum voltage at which insulation breakdown occurs. For example, the minimum voltage may be preferably 1 kV or higher, particularly preferably 2 kV or higher, and further preferably 5 kV or higher. When the minimum voltage is 2 kV or higher, insulation breakdown of the base material 11 is less likely to occur, and the reliability of the pressure sensitive adhesive sheet for batteries 1 can be higher.

The base material 11 may preferably have flame retardancy that satisfies the flame retardancy level V-0 according to the UL 94 standard. When the base material 11 has such flame retardancy, denaturation and deformation of the base material 11 can be suppressed even if the battery generates heat due to its ordinary use. Moreover, even if troubles occur in the battery and it generates excessive heat, ignition and/or burning of the base material 11 can be suppressed to prevent a serious accident.

The material of the base material 11 can be appropriately selected from the viewpoints of insulation properties, flame retardancy, heat resistance, reactivity with an electrolyte solution, permeability to an electrolyte solution, and the like. In particular, it may be preferred to use a resin film as the base material 11. Examples of the resin film include films of polyesters such as polyethylene terephthalate, polybutylene terephthalate and polyethylene naphthalate, polyolefin films such as a polyethylene film and a polypropylene film, films of a polymer that contains nitrogen in its main chain, such as a polyamide film, a polyimide film and a polyamideimide film, cellophane, a diacetyl cellulose film, a triacetyl cellulose film, an acetyl cellulose butyrate film, a polyvinyl chloride film, a polyvinylidene chloride film, a polyvinyl alcohol film, an ethylene-vinyl acetate copolymer film, a polystyrene film, a polycarbonate film, a polymethylpentene film, a polysulfone film, a polyether ether ketone film, a polyether sulfone film, a polyether imide film, a fluorine resin film, an acrylic resin film, a polyurethane resin film, a norbornene-based polymer film, a cyclic clef in-based polymer film, a cyclic conjugated diene-based polymer film, a vinyl alicyclic hydrocarbon polymer film, other resin films, and laminated films thereof. In particular, from the viewpoints of insulation properties and flame retardancy, films of a polymer, that contains nitrogen in its main chain (the films may contain other components than the polymer, here and hereinafter) may be preferred, films of a polymer that has a nitrogen-containing ring structure in the main chain may be particularly preferred, and films of a polymer that has a nitrogen-containing ring structure and an aromatic ring structure in the main chain may be further preferred. Specifically, for example, a polyimide film, a polyetherimide film, or a polyether ether ketone film, may be preferred, among which the polyimide film may be preferred because it is particularly excellent in the insulation properties and flame retardancy.

The thickness of the base material 11 may be preferably 5 μm or more, particularly preferably 10 μm or more, and further preferably 15 μm or more as the lower limit. When the lower limit of the thickness of the base material 11 satisfies the above, breakage of the base material 11 can be effectively suppressed even in a case in which, for example, an electrode body configured such that an electrode lead-out tab is fixed by the pressure sensitive adhesive sheet for batteries 1 is wound up and the winding pressure is applied to the pressure sensitive adhesive sheet for batteries 1. From another aspect, the thickness of the base material 11 may be preferably 200 μm or less, particularly preferably 100 μm or less, and further preferably 40 μm or less as the upper limit. When the upper limit of the thickness of the base material 11 satisfies the above, the pressure sensitive adhesive sheet for batteries 1 can have moderate flexibility and, even in a case in which the pressure sensitive adhesive sheet for batteries 1 is attached to a surface having a height difference, such as in a case in which an electrode and an electrode lead-out tab are fixed to each other, the pressure sensitive adhesive sheet for batteries 1 can well follow the height difference.

1-2. Pressure Sensitive Adhesive Layer (1) Inorganic Fine Particles

The pressure sensitive adhesive layer 12 contains a pressure sensitive adhesive component and also contains inorganic fine particles 121. The inorganic fine particles 121 are not limited, provided that they can impart desired insulation properties to the pressure sensitive adhesive layer. 12 and can achieve the previously described haze value of the pressure sensitive adhesive layer 12. Examples for use include powders of calcium carbonate, aluminum hydroxide, alumina, titania, silica, boehmite, talc, iron oxide, silicon carbide, barium sulfate, boron nitride, zirconium oxide, etc., beads obtained by pelletizing them, single crystal fibers, and glass fibers. These may each be used alone and two or more types may also be used as a mixture. Among these, at least one of calcium carbonate and aluminum hydroxide may be preferably used from the viewpoints of achieving high insulation properties and readily adjusting the haze value to the previously described range.

The average particle diameter of the inorganic fine particles 121 may be preferably 0.01 μm or more, more preferably 0.1 μm or more, particularly preferably 0.2 μm; or more, and further preferably 0.3 μm or more. From another aspect, the average particle diameter of the inorganic fine particles 121 may be preferably 10 μm or less, particularly preferably 5 μm or less, and further preferably 1.4 μm or less. When the average particle diameter of the inorganic fine particles 121 falls within the above range, the haze value of the pressure sensitive adhesive layer 12 can be readily adjusted to the previously described range. When the average particle diameter of the inorganic fine particles 121 is 0.01 μm or more, the pressure sensitive adhesive sheet for batteries 1 according to the present embodiment can readily exhibit high insulation properties. When the average particle diameter of the inorganic fine particles 111 is 10 μm or less, the dispersibility of the inorganic fine particles 121 is more excellent, and the occurrence of irregularities on the surface of the pressure sensitive adhesive layer 12 opposite to the base material 11 can be effectively prevented, so that excellent adhesive strength can be readily achieved. The average particle diameter of the inorganic fine particles 121 is to be measured by a laser diffraction/scattering method.

The refractive index of the inorganic fine particles 121 may be preferably 1.4 or more, particularly preferably 1.5 or more, and further preferably 1.55 or more. From another aspect, the refractive index of the inorganic fine particles 121 may be preferably 2 or less, particularly preferably 1.3 or less, and more preferably 1.1 or less. When the refractive index of the inorganic fine particles 121 falls within the above range, the haze value of the pressure sensitive adhesive layer 12 can be readily adjusted to the previously described range.

The above-described refractive index of the inorganic fine particle 121 may be measured by the following method. That is, after a sample is prepared through placing the inorganic particles 121 on a slide glass, dropping a refractive index standard solution on the inorganic particles 121, and covering them with a cover glass, the sample is observed with a microscope, and the refractive index value of the refractive index standard solution when the profile of fine particles is most difficult to see is determined as the refractive index of the inorganic fine particles 121.

The content of the inorganic fine particles 121 in the pressure sensitive adhesive layer 12 may be preferably 1 vol % or more, particularly preferably 5 vol % or more, and further preferably 10 vol % or more with respect to the pressure sensitive adhesive layer 12. From another aspect the content of the inorganic fine particles 121 in the pressure sensitive adhesive layer 12 may be preferably 50 vol % or less, particularly preferably 40 vol % or less, and further preferably 30 vol % with respect to the pressure sensitive adhesive layer 12. When the inorganic fine particles 121 are contained in the pressure sensitive adhesive layer 12 with the above-described range of the volume ratio, the haze value of the pressure sensitive adhesive layer 12 can be readily adjusted to the previously described range. When the above-described content is 1 vol % or more with respect to the pressure sensitive adhesive layer 12, the haze value of the pressure sensitive adhesive layer 12 can be readily increased td a certain degree, and the pressure sensitive adhesive sheet for batteries 1 according to the present embodiment may readily exhibit high insulation properties. When the above-described content is 50 vol % or less with respect to the pressure sensitive adhesive layer 12, the haze value of the pressure sensitive adhesive layer 12 can be readily reduced to a curtain degree, end the pressure sensitive adhesive sheet for batteries 1 according to the present embodiment is more excellent in the suitability for foreign material inspection.

The content of the inorganic fine particles 121 in the pressure sensitive adhesive layer 12 may be preferably 5 mass parts or more, particularly preferably 15 mass parts or more, and further preferably 25 mass parts or more with respect to 100 mass parts of the pressure sensitive adhesive component contained in the pressure sensitive adhesive layer 12. From another aspect, the content of the inorganic fine particles 121 in the pressure sensitive adhesive layer 12 may be preferably 500 mass parts or less, particularly preferably 250 mass parts or less, and further preferably 100 mass parts or less with respect to 100 mass parts of the pressure sensitive adhesive component contained in the pressure sensitive adhesive layer 12. When the inorganic fine particles 121 are contained in the pressure sensitive adhesive layer. 12 so that the content of the inorganic fine particles 121 falls within the above-described range with respect to 100 mass parts of the pressure sensitive adhesive component contained in the pressure sensitive adhesive layer 12, the volume ratio of the inorganic fine particles 121 contained in the pressure sensitive adhesive layer 12 can be readily adjusted to the previously described range, (2) Pressure Sensitive Adhesive Component The pressure sensitive adhesive component contained in the pressure sensitive adhesive layer 12 is not particularly limited and can be appropriately selected from the viewpoints of solubility in an electrolyte solution, flame retardancy, heat resistance, insulation properties, and the like. In particular, it is preferred to use at least one of an acrylic-based pressure sensitive adhesive component, a silicone-based pressure sensitive adhesive component, a rubber-based pressure sensitive adhesive component, and a urethane-based pressure sensitive adhesive component as the pressure sensitive adhesive component. The pressure sensitive adhesive component contained in the pressure sensitive adhesive layer 12 may be any of an emulsion type, a solvent type, or a non-solvent type and may also be any of a crosslinked type or a non-crosslinked type. Among the above, an acrylic-based pressure sensitive adhesive component is preferred, a crosslinked-type acrylic-based pressure sensitive adhesive component is 1.5 particularly preferred, and a solvent and crosslinked-type acrylic-based pressure sensitive adhesive component is further preferred, from the viewpoints of ease of fine adjustment of the adhesive strength, etc.

The above-described acrylic-based pressure sensitive adhesive component may preferably be composed of a (meth)acrylic ester polymer (A) and a crosslinker (B). In this case, the pressure sensitive adhesive layer 12 contains the acrylic-based pressure sensitive adhesive component, which is composed of the (meth)acrylic ester polymer (A) and the crosslinker (B), and the inorganic fine particles 121. Such a pressure sensitive adhesive layer 12 may preferably be formed of a pressure sensitive adhesive composition that contains the (meth)acrylic ester polymer (A), the crosslinker (B), and the inorganic fine particles 121 (this composition may be referred to as a "pressure sensitive adhesive composition P," hereinafter).

As used in the present description, the term "(meth) acrylic ester" refers to both the acrylic ester and the methacrylic ester. The same applies to other similar terms. As used in the present description, the term "polymer" encompasses the concept of a "copolymer."

(2-1) (Meth)Acrylic Ester Polymer (A)

From the viewpoint that the pressure sensitive adhesive layer 12 can readily have a high adhesion property to an adherend, the (meth)acrylic ester polymer (A) may preferably contain (meth)acrylic alkyl ester of which the carbon number of alkyl group is 1 to 10, as the monomer unit which constitutes the polymer. Examples of such (meth)acrylic alkyl ester include methyl (meth)acrylate, ethyl (meth)acrylate, propyl (meth)acrylate, n-hexyl (meth)acrylate, n-pentyl (meth)acrylate, n-hexyl (meth)acrylate, 2-ethylhexyl (meth) acrylate, isooctyl (meth)acrylate, and n-decyl (meth)acrylate. Among these, acrylic alkyl ester of which the carbon number of alkyl group is 3 to 9 is preferred, and acrylic alkyl ester of which the carbon number of alkyl group is 5 to 8 is particularly preferred. These may each be used alone and two or more types may also be used in combination.

The (meth)acrylic ester polymer (A) may preferably contain 50 mass % or more, particularly preferably 60 mass % or more, and further preferably 70 mass % or more of the (meth)acrylic alkyl ester of which the carbon number of alkyl group is 1 to 10, as the monomer unit which constitutes the polymer. When 50 mass % or more of the above (meth)acrylic alkyl ester is contained, the adhesion property to an adherend is more improved. From another aspect, the (meth)acrylic ester polymer (A) may preferably contain 99 mass % or less, particularly preferably 95 mass % or less, and further preferably 90 mass % or less of the (meth)acrylic alkyl ester of which the carbon number of alkyl group is 1 to 10, as the monomer unit which constitutes the polymer. When the content of the above (meth)acrylic alkyl ester is 99 mass % or less, an appropriate amount of other monomer components can be introduced into the (meth)acrylic ester polymer (A).

From the viewpoint that the pressure sensitive adhesive layer 12 can readily have excellent electrolyte solution resistance, the (meth)acrylic ester polymer (A) may preferably contain (meth)acrylic alkyl ester of which the carbon number of alkyl group is 11 to 25, as the monomer unit which constitutes the polymer. Examples of such (meth)

acrylic alkyl ester include n-lauryl (meth)acrylate, myristyl (meth)acrylate, palmityl (meth)acrylate, and stearyl (meth) acrylate. Among these, (meth)acrylic alkyl ester of which the carbon number of alkyl group is 12 to 18 is preferred. These may each be used alone and two or more types may also be used in combination.

The (meth)acrylic ester polymer (A) may preferably contain 1 mass % or more, more preferably 5 mass % or more, and particularly preferably 10 mass % or more of the (meth)acrylic alkyl ester of which the carbon number of alkyl group is 11 to 20, as the monomer unit which constitutes the polymer. When the content is 1 mass % or more, the pressure sensitive adhesive layer 12 obtained can have a higher hydrophobic property, and more excellent electrolyte solution resistance can thereby be readily achieved. From another aspect, the (meth)acrylic ester polymer. (A) may preferably contain 40 mass % or less, more preferably 30 mass % or less, and particularly preferably 20 mass % or less of the (meth)acrylic alkyl ester of which the carbon number of alkyl group is 11 to 20, as the monomer unit which constitutes the polymer. When 40 mass % or less of the above (meth)acrylic alkyl ester, is contained, an appropriate amount of other monomer components can be readily introduced into the (meth)acrylic ester polymer (A).

If desired, the (meth)acrylic ester polymer (A) may contain monomers other than the above as the monomer unit which constitutes the polymer. Examples of such monomers include a monomer that contains a reactive functional group and a monomer that does not contain a reactive functional group.

Examples of the monomer which contains a reactive functional group (reactive functional group-containing monomer) include a monomer having a carboxy group in the molecule (carboxy group-containing monomer), a monomer having a hydroxyl group in the molecule (hydroxyl group-containing monomer), and a monomer having an amino group in the molecule (amino group-containing monomer). The (meth)acrylic ester polymer (A) may preferably contain the hydroxyl group-containing monomer or the carboxy group-containing monomer, among the above, as the monomer unit which constitutes the polymer, and may particularly preferably contain the carboxy group-containing monomer as the monomer unit which constitutes the polymer. When the carboxy group-containing monomer, is contained, the polarity of the pressure sensitive adhesive "layer" 12 formed is high, and the resistance to dissolution into an electrolyte solution is more excellent.

Examples of the carboxy group-containing monomer include ethylenically unsaturated carboxylic acids ouch as acrylic acid, methacrylic acid, crotonic acid, maleic acid, itaconic acid, and citraconic acid. Among these, acrylic acid may be preferred. According to the acrylic acid, the above effects may be more excellent. The above carboxy group-containing monomers may each be used alone and two or more types may also be used in combination.

Examples of the hydroxyl group-containing monomer include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth) acrylate. These may each be used alone and two or more types may also be used in combination.

Examples of the amino group-containing monomer include aminoethyl (meth)acrylate and n-butylaminoethyl (meth)acrylate. These may each be used alone and two or more types may also be used in combination.

The (meth)acrylic ester polymer (A) may preferably contain 0.5 mass % or more, particularly preferably 1 mass % or more, and further preferably 3 mass % or more of the reactive functional group-containing monomer as the monomer unit which constitutes the polymer. From another aspect, the (meth)acrylic ester polymer (A) may preferably contain 30 mass % or less, particularly preferably 20 mass % or less, and further preferably 9 mass % or less of the reactive functional group-containing monomer as the monomer unit which constitutes the polymer. When the (meth) acrylic ester, polymer (A) contains the above amount of the reactive functional group-containing monomer as the monomer unit, a crosslinked structure is well formed by the reaction with the crosslinker (B) to moderately enhance the cohesive strength of the pressure sensitive adhesive layer 12 formed, and the resistance to dissolution into an electrolyte solution can thereby be more excellent.

Examples of the monomer which does not contain a reactive functional group include alkoxyalkyl (meth)acrylates such as methoxyethyl (meth)acrylate and ethoxyethyl (meth)acrylate, (meth)acrylic esters having a non-crosslinkable tertiary amino group, such as N,N-dimethylaminoethyl (meth)acrylate, N,N-dimethylaminopropyl (meth)acrylate and (meth)acryloyl morpholine, (meth)acrylamide, dimethyl acrylamide, vinyl acetate, and styrene. These may each be used alone and two or more types may also be used in combination.

The (meth)acrylic ester polymer (A) may be a polymer obtained by solution polymerization, a polymer, obtained by polymerization without a solvent, or a polymer obtained by emulsion polymerization. Among these, a solution polymerization product obtained by a solution polymerization method may be preferred. Being a solution polymerization product allows a high molecular-weight linear polymer to be easily obtained, and the pressure sensitive adhesive layer 12 can readily nave more excellent electrolyte solution resistance.

The polymerization form of the (meth)acrylic ester polymer (A) may be a random copolymer, and may also be a block copolymer.

The weight-average molecular weight of the (meth) acrylic ester polymer (A) may be preferably 50,000 or more, more preferably 100,000 or more, particularly preferably 200,000 or more, and further preferably 500,000 or more as the lower limit. When the lower limit of the weight-average molecular weight of the (meth)acrylic ester polymer (A) satisfies the above, the pressure sensitive adhesive layer 12 formed can have more excellent resistance to dissolution into an electrolyte solution.

From another aspect, the weight-average molecular weight of the (meth)acrylic ester polymer (A) may be preferably 2,500,000 or less, more preferably 2,000,000 or less, particularly preferably 1,200,000 or less, and further preferably 950,000 or less as the upper limit. When the upper limit of the weight-average molecular weight of the (meth)acrylic ester polymer (A) satisfies the above, the adhesion property to an adherend can be more excellent. As used in the present description, the weight-average molecular weight refers to a standard polystyrene equivalent value that is measured using a gel permeation chromatography (GPC) method.

In the pressure sensitive adhesive composition P, one type of the (meth)acrylic ester polymer (A) may be used alene and two or more types may also be used in combination.

(2-2) Crosslinker (B)

It suffices that the crosslinker (B) is reactive with a reactive functional group of the (meth)acrylic ester polymer (A). Examples of the crosslinker (B) include an isocyanate-based crosslinker, an epoxy-based crosslinker, an amine-based crosslinker, a melamine-based crosslinker, an aziridine-based crosslinker, a hydrazine-based crosslinker, an aldehyde-based crosslinker, an oxazoline-based crosslinker, a metal alkoxide-based crosslinker, a metal chelate-based crosslinker, a metal salt-based crosslinker, and an ammonium salt-based crosslinker. One type of the crosslinker (B) may be used alone and two or more types may also be used in combination.

From the viewpoints of the reactivity with the reactive functional group of the (meth)acrylic ester polymer (A), in particular, with the carboxy group originated from the carboxy croup-containing monomer, the electrolyte solution resistance after the reaction, the insulation properties, etc., it may be preferred to use the isocyanate-based crosslinker among the above.

The isocyanate-based crosslinker contains at least a polyisocyanate compound. Examples of the polyisocyanate compound include aromatic polyisocyanates such as tolylene diisocyanate, diphenylmethane diisocyanate and xylylene diisocyanate, aliphatic polyisocyanates such as hexamethylene diisocyanate, alicyclic polyisocyanates such as isophorone diisocyanate and hydrogenated diphenylmethane diisocyanate, biuret bodies and isocyanurate bodies thereof, and adduct bodies that are reaction products with low molecular active hydrogen-containing compounds such as ethylene glycol, propylene glycol, neopentyl glycol, trimethylol propane, and castor oil. Among these, trimethylolpropane-modified aromatic polyisocyanate may be preferred, and trimethylolpropane-modified tolylene diisocyanate and trimethylolpropane-modified xylylene diisocyanate may be particularly preferred, from the viewpoint of reactivity with hydroxyl groups.

The content of the crosslinker (B) in the pressure sensitive adhesive composition P tray be preferably 0.1 mass parts or more, particularly preferably 0.5 mass parts or more, and further preferably 1 mass part or more as the lower limit to 100 mass parts of she (meth)acrylic ester polymer (A). From another aspect, the content may be preferably 20 mass parts or less, particularly preferably 15 mass parts or less, and further preferably 10 mass parts or less as the upper limit. When the content of the crosslinker (B) fails within the above range, a crosslinked structure is well formed to moderately enhance the cohesive strength of the pressure sensitive adhesive layer 12 formed, and the resistance to dissolution into an electrolyte solution can thereby be more excellent.

(2-3) Additives

If desired, the pressure sensitive adhesive composition P can contain one or more of various additives, such as a tackifier, an antioxidant, a softening agent, and a filler, which are commonly used in an acrylic-based pressure sensitive adhesive. The additives which constitute the pressure sensitive adhesive composition P are deemed not to include a polymerization solvent and a dilutent solvent, which will be described later.

(3) Production of Pressure Sensitive Adhesive Composition P

The pressure sensitive adhesive composition P can be produced through producing the (meth)acrylic ester polymer (A) and adding the inorganic fine particles 121 and, if desired, the crosslinker (B), additives, and the like to the (meth)acrylic ester polymer (A) obtained.

The (meth)acrylic ester polymer (A) can be produced by polymerizing a mixture of the monomers which constitute the polymer using a commonly-used radical, polymerization method. Polymerization of the (meth)acrylic ester polymer. (A) may preferably be carried out by a solution polymerization method, if desired, using a polymerization initiator. Note, however, that the present invention is not limited to this, and the polymerization may be carried out without a solvent. Examples of the polymerization solvent include ethyl acetate, n-butyl acetate, isobutyl acetate, toluene, acetone, hexane, and methyl ethyl ketone and two or more types thereof may also be used in combination.

Examples of the polymerization initiator include azo-based compounds and organic peroxides and two or more types thereof may also be used in combination. Examples of the azo-based compounds include 2,2'-azobisisobutyronitrile, 2,2'-azobis(2-methylbutyronitrile), 1,1'-azobis(cyclohexane 1-carbonitrile), 2,2'-azobis(2,4-dimethylvaleronitrile), 2,2'-azobis(2,4-dimethyl-4-methoxyvaleronitrile), dimethyl 2,2'-azobis(2-methylpropionate), 4,4'-azobis(4-cyanovaleric acid), 2,2'-azobis(2-hydroxymethylpropionitrile), and 2,2'-azobis[2-(2-imidazolin-2-yl)propane].

Examples of the organic peroxides include benzoyl peroxide, t-butyl perbenzoate, cumene hydroperoxide, diisopropyl peroxydicarbonate, di-n-propyl peroxydicarbonate, di(2-ethoxyethyl)peroxydicarbonate, t-butyl peroxyneodecanoate, t-butyl peroxypivalate, (3,5,5-trimethylhexanoyl) peroxide, dipropionyl peroxide, and diacetyl peroxide.

The weight-average molecular weight of the polymer to be obtained can be adjusted by compounding a chain transfer agent, such as 2-mercaptoethanol, in the above polymerization step.

After the (meth)acrylic ester polymer (A) is obtained, the pressure sensitive adhesive composition P may be obtained through adding the inorganic fine particles 121 and, if desired, the crosslinker (B), additives, and the like to the solution of the (meth)acrylic ester polymer (A) and sufficiently mixing them.

For adjustment of a suitable viscosity for coating and/or adjustment of a desired film thickness of the pressure sensitive adhesive layer 12, the pressure-sensitive adhesive composition P may be appropriately diluted with a diluent solvent or the like in addition to the previously described polymerization solvent to obtain a coating liquid, which will be described later. Examples of the diluent solvent include ethyl acetate, n-butyl acetate, isobutyl acetate, toluene, acetone, hexane, and methyl ethyl ketone and two or more types thereof may also be used in combination.

(4) Crosslinking of Pressure Sensitive Adhesive Composition P

When the pressure sensitive adhesive composition P contains the crosslinker (B), the pressure sensitive adhesive layer 12 can be formed by crosslinking the pressure sensitive adhesive composition P. Crosslinking of the pressure sensitive adhesive composition P can be usually carried out by heating treatment. The heating treatment can also serve as drying treatment when volatilizing the diluent solvent and the like from the coating film of the pressure sensitive adhesive composition P applied to a desired object.

The heating temperature of the heating treatment may be preferably 50° C. to 1.50° C. and particularly preferably 70° C. to 120° C. The heating time may be preferably 30 seconds to 10 minutes and particularly preferably 50 seconds to 5 minutes.

After the heating treatment, if necessary, an aging period at an ordinary temperature (e.g., 23° C., 50% RH) for about 1 to 2 weeks may be provided. When the aging period is necessary, the pressure sensitive adhesive layer 12 is formed after the aging period passes, while when the aging period is nor necessary, the pressure sensitive adhesive layer 12 is formed after the heating treatment is completed.

(5) Thickness of Pressure Sensitive Adhesive Layer

The thickness (a value measured in accordance with JIS K7130) of the pressure sensitive adhesive layer 12 may be preferably 1 μm or more, particularly preferably 3 μm or more, and further preferably 5 μm or more as the lower limit. When the lower limit of the thickness of the pressure sensitive adhesive layer 12 satisfies the above, the pressure sensitive adhesive sheet for batteries 1 can readily exhibit high insulation properties. From another aspect, the thickness of the pressure sensitive adhesive layer 12 may be preferably 50 μm or less, particularly preferably 20 μm or less, and further preferably 20 μm or less as the upper limit. When the upper limit of the thickness of the pressure sensitive adhesive layer 12 satisfies the above, the hate value of the pressure sensitive adhesive layer 12 can be readily adjusted to the previously described range. Moreover, when the upper limit of the thickness or the pressure sensitive adhesive layer 12 satisfies the above, the amount of electrolyte solution infiltrating into the pressure sensitive adhesive layer 12 from its end parts can be effectively reduced.

The thickness of the pressure sensitive adhesive layer 12 may be preferably 1.1 times or more, more preferably 5 times or more, particularly preferably 10 times or more, and further preferably 15 times or more of the average particle diameter of the inorganic fine particles 121. When the thickness of the pressure sensitive adhesive layer 12 is 1.1 times or more of the average particle diameter of the inorganic fine particles 121, the surface smoothness of the pressure sensitive adhesive layer 12 is more excellent, and high adhesive strength can be effectively obtained. The upper limit of the thickness ratio of the pressure sensitive adhesive layer 12 based on the average particle diameter of the inorganic fine particles 121 is not particularly limited, but may be preferably 100 times or less, more preferably 60 times or less, and particularly preferably 20 times or less.

1-3. Release Sheet

The release sheet 13 is to protect the pressure sensitive adhesive layer 12 until the use of the pressure sensitive adhesive sheet for batteries 1 and is removed when using the pressure sensitive adhesive sheet for batteries 1. In the pressure sensitive adhesive sheet for batteries 1 according to the present embodiment, the release sheet 13 may not necessarily be required.

Examples of the release sheet 13 for use include a polyethylene film, a polypropylene film, a polybutene film, a polybutadiene film, a polymethylpentene film, a polyvinyl chloride film, a vinyl chloride copolymer film, a polyethylene terephthalate film, a polyethylene naphthalate film, a polybutylene terephthalate film, a polyurethane film, an ethylene-vinyl acetate film, an ionomer resin film, an ethylene-(meth)acrylic acid copolymer film, an ethylene-(meth)acrylic ester copolymer film, a polystyrene film, a polycarbonate film, a polyimide film, a fluorine resin film, and a liquid crystal polymer film. Crosslinked films thereof may also be used. A laminate film obtained by laminating a plurality of such films may also be used.

It may be preferred to perform release treatment for the release surface (surface to be in contact with the pressure sensitive adhesive layer 12) of the release sheet 13. Examples of a release agent to be used for the release treatment include alkyd-based, silicone-based, fluorine-based, unsaturated polyester-based, polyolefin-based, and wax-based release agents.

The thickness of the release sheet 13 is not particularly limited, but may be usually about 20 to 150 μm.

2. Physical Properties, Etc. of Pressure Sensitive Adhesive Sheet for Batteries (1) Haze Value of Pressure Sensitive Adhesive Sheet for Batteries The haze value of the pressure sensitive adhesive sheet for batteries 1 (excluding the release sheet 13) according to the present embodiment may be preferably 90% or less, particularly preferably 85% or less, and further preferably 80% or leas. When the haze value of the pressure sensitive adhesive sheet for batteries 1 is 90% or less, the foreign materials present between the pressure sensitive adhesive sheet for batteries 1 and an adherend can be more readily found. In the pressure sensitive adhesive sheet for batteries 1 according to the present embodiment, the haze value of the pressure sensitive adhesive layer 12 alone falls within the previously described range, and the haze value of the pressure sensitive adhesive sheet for batteries 1 (excluding the release sheet 13) can thereby be readily adjusted to a relatively low value as the above. The lower limit of the hate value of the pressure sensitive adhesive sheet for batteries 1 (excluding the release sheet 13) is not particularly limited, and may be, for example, 50% or more in an embodiment, 56% or more in another embodiment, and 62% or more in still another embodiment. Details of the method of measuring the hate value of the pressure sensitive adhesive sheet for batteries 1 (excluding the release sheet 13) are as described in the Testing Example, which will be described later.

(2) Total Luminous Transmittance of Pressure Sensitive Adhesive Sheet for Batteries The total luminous transmittance of the pressure sensitive adhesive sheet for batteries 1 (excluding the release sheet 13) according to the present embodiment may be preferably 20% or more, particularly preferably 35% or more, and further preferably 50% or more. When the total luminous transmittance of the pressure sensitive adhesive sheet for batteries 1 is 20% or more, the foreign materials present between the pressure sensitive adhesive sheet for batteries 1 and an adherend can be further readily found. In the pressure sensitive adhesive sheet for batteries 1 according to the present embodiment, the haze value of the pressure sensitive adhesive layer 12 alone falls within the previously described range, and the total luminous transmittance of the pressure sensitive adhesive sheet for batteries 1 (excluding the release sheet 13) can thereby be readily adjusted to a relatively high value as the above. The upper limit of the total luminous transmittance of the pressure sensitive adhesive sheet for batteries 1 (excluding the release sheet 13) is not particularly limited, and may be, for example, 100% or less in an embodiment, 80% or less in another embodiment, and 60% or less in still another embodiment. Details of the method of measuring the total luminous transmittance of the pressure sensitive adhesive sheet for batteries 1 (excluding the release sheet 13) are as described in the Testing Example, which will be described later.

(3) Adhesive Strength

The adhesive strength of the pressure sensitive adhesive sheet for batteries 1 according to the present embodiment to an aluminum plate may be preferably 0.5 N/25 mum or more and more preferably 1.0 N/25 mm or more as the lower limit. When the lower limit of the adhesive strength of the pressure sensitive adhesive sheet for batteries 1 satisfies the above, a trouble is less likely to occur that the pressure sensitive adhesive sheet for batteries 1 delaminates from an adherend (in particular, from a metal member). The upper limit of the above adhesive strength is not particularly limited, but may be preferably 50 N/25 mm or less in general, more preferably 40 N/25 mm or less, particularly preferably 30 N/25 mm or less, and further preferably 5 N/25 nm or less. As used in the present description, the adhesive strength refers basically to a peel strength that is measured using a method of 180° peeling in accordance with JIS Z0237: 2009. Details of the method of measurement are as described in the Testing Example, which will be described later.

(4) Insulation Properties (Rise in Temperature Due to Forced Internal Short Circuit Test)

When the forced internal short circuit test for a battery is performed in accordance with JIS C8714: 2007 using the pressure sensitive adhesive sheet for batteries 1 (excluding the release sheet 13) and small nickel pieces of a standard size (height 0.2 mm, width 0.1 mm, L-shaped with a side of 1 mm, angle 90°), the rise in temperature of the battery side surface may be preferably 30° C. or less, particularly preferably 20° C. or less, and further preferably 15° C. or less. When using small nickel pieces of a larger size (height 0.5 mm, width 0.2 mm, L-shaped with a side of 3 mm, angle 90°) than the standard size, the rise in temperature of the battery side surface may be preferably 100° C. or less, particularly preferably 50° C. or less, and further preferably 30° C. or less. Details of the forced internal short, circuit test are as described in the Testing Example, which will be described later.

It can be said that when the rise in temperature due to the forced internal short circuit test satisfies the above, the pressure sensitive adhesive sheet for batteries 1 has high insulation properties, and a battery manufactured using the pressure sensitive adhesive sheet for batteries 1 can have high safety. The pressure sensitive adhesive sheet for batteries 1 according to the present embodiment includes the pressure sensitive adhesive layer 12, which contains the inorganic fine particles 121, thereby to allow the rise in temperature due to the forced internal short circuit tear, to be suppressed low as the above.

(5) Thickness of Pressure Sensitive Adhesive Sheet for Batteries

The thickness of the pressure sensitive adhesive sheet for batteries 1 (excluding the thickness of the release sheet 13) may be preferably 10 μm or more, particularly preferably 10 μm or more, and further preferably 20 μm or more. From, another aspect, the thickness of the pressure sensitive adhesive sheet, for batteries 1 may be preferably 250 μm or less, particularly preferably 110 μm or less, and further preferably 45 nm or less. When the thickness of the pressure sensitive adhesive sheet for batteries 1 is 10 μm or more, both the excellent adhesion strength and the high insulation properties can be readily achieved. When the thickness of the pressure sensitive adhesive sheet for batteries 1 is 250 μm or less, the pressure sensitive adhesive sheet for batteries 1 can have better translucency and allows the foreign materials present between the pressure sensitive adhesive sheet for batteries 1 and an adherend to be readily found through the pressure sensitive adhesive sheet for batteries 1.

3. Method of Manufacturing Pressure Sensitive Adhesive Sheet for Batteries

The method of manufacturing the pressure sensitive adhesive sheet for batteries 1 according to the present embodiment is not particularly limited, provided that the pressure sensitive adhesive layer 12 can be formed on one side of the base material 11. For example, the release surface or the release sheet 13 may be coated with a coating liquid that contains the previously described pressure sensitive adhesive composition P and may further contain a solvent, if desired, and heating treatment may be performed to form a coating film. The coating film formed as such may be the pressure sensitive adhesive layer 12 if an aging period is not necessary. If the aging period is necessary, the formed coating film may become the pressure sensitive adhesive layer 32 after the aging period passes. Conditions for the heating treatment and aging are as previously described. Subsequently, after one surface of the base material 11 is attached to the surface of the formed pressure sensitive adhesive layer 12 opposite to the release sheet 13 and, if necessary, an aging period may be provided, the pressure sensitive adhesive sheet for batteries 1 can be obtained.

Drying treatment when volatilizing a diluent solvent and the like of the coating liquid can also serve as the above heating treatment. When performing the heating treatment, the heating temperature may be preferably 50° C. to 150° C. and particularly preferably 70° C. to 120° C. The heating time may be preferably 30 seconds to 10 minutes and particularly preferably 50 seconds to 2 minutes. After the heating treatment, if necessary, an aging period at an ordinary temperature (e.g., 23° C., 50% RH) for about 1 to 2 weeks may be provided.

Another method of manufacturing the pressure sensitive adhesive sheet for batteries 1 according to the present embodiment may include coating the base material 13 with the pressure sensitive adhesive composition P and then forming the pressure sensitive adhesive layer 32 on the base material 11 thereby to obtain the pressure sensitive adhesive sheet for batteries 1. Coating with the pressure sensitive adhesive composition P, heating treatment, and aging in this case can be performed as in the previously described method.

<Lithium-Ion Battery>

The lithium-ion battery according to an embodiment of the present invention may be configured such that two or more conductors are fixed in a state of being in contact with each other inside the battery using the previously described pressure sensitive adhesive sheet for batteries 1. It may be preferred that at least one of the two or more conductors be in a sheet-like shape while at least another one be in a line-like or tape-like shape. The lithium-ion battery according to a preferred embodiment will be described below.

Figure 2:
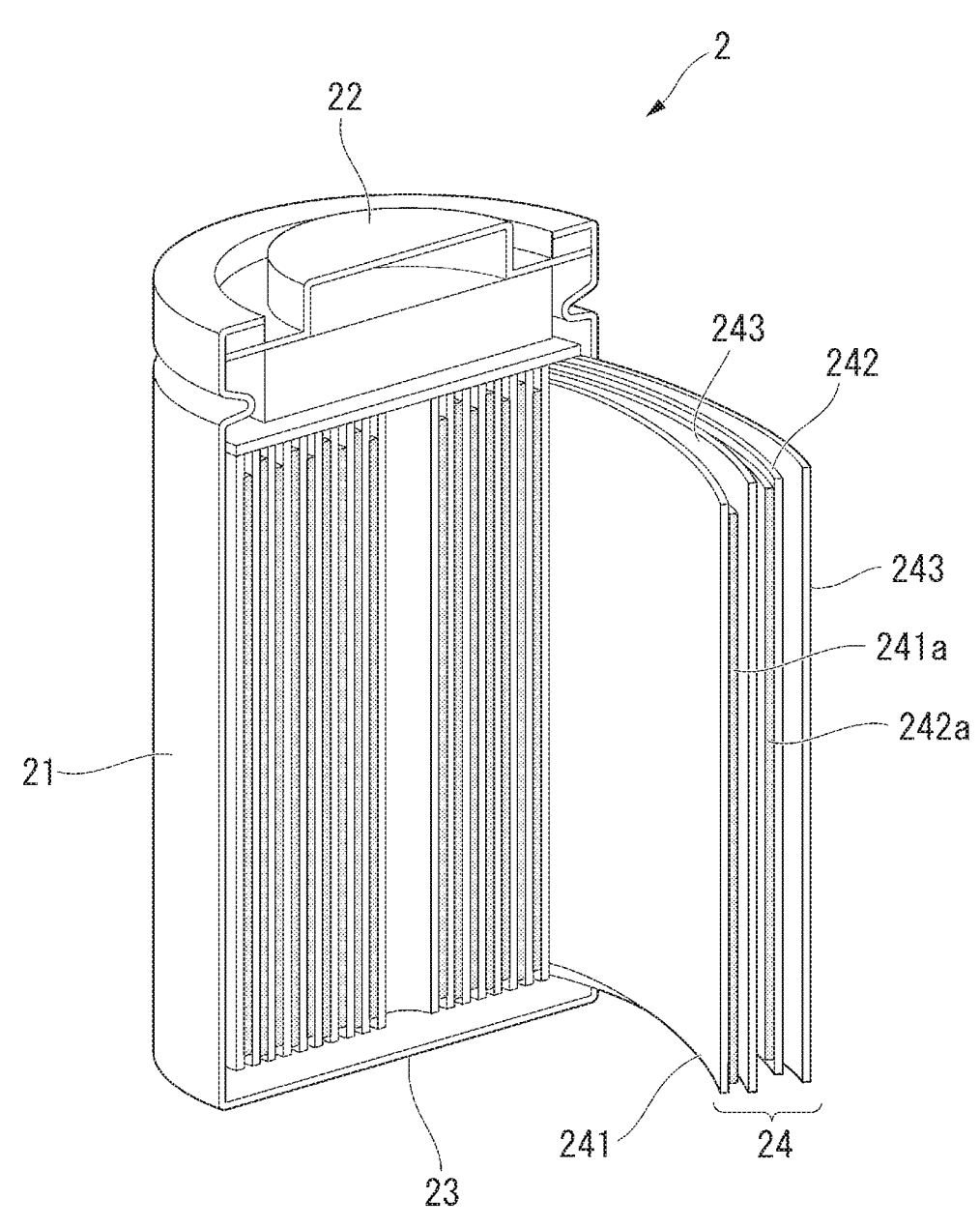
FIG. 2 is a partially cross-sectional, exploded perspective view of a lithium-ion battery according to an embodiment of the present invention.

As illustrated in FIG. 2, the lithium-ion battery 2 according to the present embodiment may include a bottomed cylindrical exterior body 21 of which the bottom part constitutes a negative electrode terminal 23, a positive electrode terminal 22 provided at an opening part of the exterior body 21, and an electrode body 24 provided inside the exterior body 21. An electrolyte solution may be enclosed in the lithium-ion battery 2.

The electrode body 24 may include a positive electrode collector 241 laminated with a positive electrode active material layer 241a, a negative electrode collector 242 laminated with a negative electrode active material layer 242a, and separators 243 interposed therebetween. The laminate of the positive electrode collector 241 and the positive electrode active material layer 241a may be referred to as a positive electrode while the laminate of the negative electrode collector 242 and the negative electrode active material layer 242a may be referred to as a negative electrode, and the positive electrode and the negative electrode may be collectively referred to as an electrode or electrodes. The positive electrode, the negative electrode, and the separators 243 may be wound up together and then inserted inside the exterior body 21.

Figure 3:
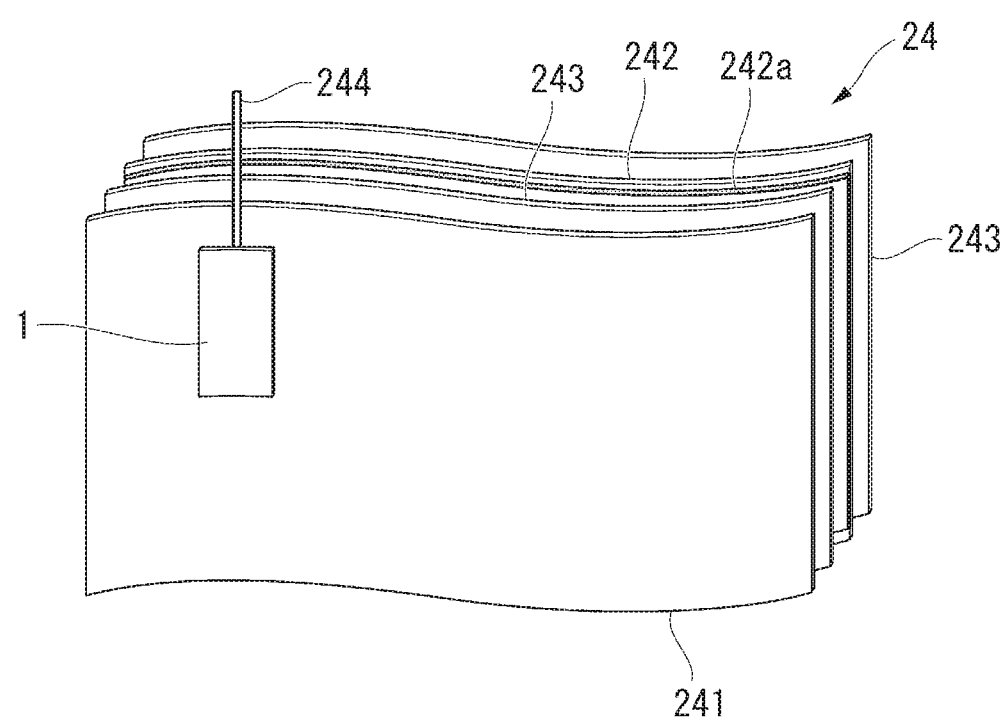
FIG. 3 is a developed, perspective view of an electrode body of the lithium-ion battery according to an embodiment of the present invention.

As illustrated in FIG. 3, a line-like or tape-like electrode lead-out tab 244 may be attached to the positive electrode collector 241 using the previously described pressure sensitive adhesive sheet for batteries 1, and the electrode lead-out tab 244 can thereby be electrically connected to the positive electrode collector 241. The electrode lead-out tab 244 may be electrically connected also to the above positive electrode terminal 22. The negative electrode collector 242 may be electrically connected to the negative electrode terminal 23 via an electrode lead-out tab which is not illustrated.

In general, the positive electrode collector 241 and the negative electrode collector 242 may be made of a material of metal such as aluminum while the electrode lead-out tab 244 may be made of a material of metal such as aluminum or cooper.

The electrolyte solution used m the lithium-ion battery 2 may ordinarily be a nonaqueous electrolyte solution. Preferred examples of the nonaqueous electrolyte solution include those in which a lithium salt as the electrolyte is dissolved in a mixed solvent of a cyclic carbonate ester and a lower chain carbonate ester.

Examples of the lithium salt for use include fluorine-based complex salts, such as lithium hexafluorophosphate (LiPF$_6$) and lithium borofluoride (LiBF$_4$), and LiN(SO$_2$Rf)$_2$·LiC(SO$_2$Rf)$_3$ (where Rf=CF$_3$, C$_2$F$_5$). Examples of the cyclic carbonate ester for use include ethylene carbonate and propylene carbonate. Preferred examples of the lower chain carbonate ester include dimethyl carbonate, ethyl methyl carbonate, and diethyl carbonate.

The lithium-ion battery 2 according to the present embodiment can be manufactured by an ordinary method except that the previously described pressure sensitive adhesive sheet for batteries 1 is used for fixation of the electrode lead-out tab 244.

In the lithium-ion battery 2 according to the present embodiment, the electrode lead-out tab 244 is attached to the positive electrode collector 241 using the pressure sensitive adhesive sheet for batteries 1. In the pressure sensitive adhesive sheet for batteries 1, even if foreign materials are mixed between the pressure sensitive adhesive sheet for batteries 1 and an adherend, the foreign materials can be readily found because the haze value of the pressure sensitive adhesive layer 12 is 50% or more and 85% or less. It is therefore possible to prevent the occurrence of internal short circuit due to the presence of foreign materials. Moreover, the pressure sensitive adhesive sheet for batteries 1 includes the pressure sensitive adhesive layer 12, which contains the inorganic fine particles 121, thereby to have high insulation properties, and even if internal short circuit occurs, the temperature rise due to the internal short circuit can be suppressed low. Thus, the lithium-ion battery 2 according to the present embodiment has high safety.

It should be appreciated that the embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the pressure sensitive adhesive sheet for batteries 1, the release sheet 13 may be omitted. In an embodiment, the pressure sensitive adhesive sheet for batteries 1 may be provided with one or more other layers between the base material 11 and the pressure sensitive adhesive layer 12.

EXAMPLES

Hereinafter, the present invention will be described further specifically with reference to examples, etc., but the scope of the present invention is not limited to these examples, etc.

Example 1

1. Preparation of Coating Liquid of Pressure Sensitive Adhesive Composition

A (meth)acrylic ester polymer was prepared using a solution polymerization method to copolymerize 80 mass parts of 2-ethylhexyl acrylate, 11 mass parts of lauryl methacrylate, and 5 mass parts of acrylic acid. The molecular weight of this polymer was measured using gel permeation chromatography (GPC), which will be described later. The weight-average molecular weight (Mw) was 750,000.

Then, 100 mass parts (solid content equivalent, here and hereinafter) of the obtained (meth)acrylic ester polymer and 3.72 mass parts of trimethylolpropane-modified tolylene diisocyanate (available from TOYOCHEM CO., LTD., trade name "BHS3515") as an isocyanate-based crosslinker were mixed and diluted with ethyl acetate to obtain a diluted liquid having a solid concentration of 30%. The diluted liquid contains, as the pressure sensitive adhesive component, the above (meth)acrylic ester polymer and the above isocyanate-based crosslinker.

For the diluted liquid thus obtained, 27.5 mass parts of calcium carbonate fine particles (available from Konoshima Chemical Co., Ltd., product name "Calcium Carbonate Light," average particle diameter: 1.1 μm, refractive index: 1.69) were added to 100 mass parts of the above pressure sensitive adhesive component, and they were mixed to obtain a coating liquid of the pressure sensitive adhesive composition.

2. Formation of Pressure Sensitive Adhesive Layer

A release sheet (available from LINTEC Corporation, trade name "SP-PET251130") was prepared in which one surface of a polyethylene terephthalate film was subjected to release treatment using a silicone-based release agent. The release-treated surface of the release sheet was coated with the coating liquid of the pressure sensitive adhesive composition obtained in the above step 1 using a knife coater and the obtained coating film was dried at 120° C. for 1 minute to form a pressure sensitive adhesive layer, having a thickness of 9 μm. A laminate composed of the release-sheet end the pressure sensitive adhesive layer, was thus obtained. The content of the inorganic fine particles in the pressure sensitive adhesive layer formed was measured by a method to be described later. The content was 10 vol %.

3. Production of Pressure Sensitive Adhesive Sheet for Batteries

The surface of the laminate, obtained in the above step 2, on the side of the pressure sensitive adhesive layer and one surface of a polyimide film (available from DU PONT-TORAY CO., LTD., product name "Kapton 100H," thickness: 25 μm, flame retardation level according to UL94 standard: V-0, haze value as measured by Testing Example 1 to be described later: 6.01%, total luminous transmittance as measured by Testing Example 1 to be described later: 53.6%) as a base material were attached to each other and they were then aged at 23° C. and 50% RH for 7 days to obtain a pressure sensitive adhesive sheet for batteries in which the base material, the pressure sensitive adhesive layer, and the release sheet were laminated in this order.

Here, the previously described weight-average molecular weight (Mw) refers to a weight-average molecular weight that is measured as a standard polystyrene equivalent value under the following condition using gel permeation chromatography (GPC) (GPC measurement).

<Measurement Condition>

GPC measurement apparatus: HLC-8320 available from Tosoh Corporation

GPC columns (passing through in the following order): available from Tosoh Corporation TSK gel super H-H TSK gel super HM-H TSK gel super H2000

Solvent for measurement: tetrahydrofuran

Measurement temperature: 40° C.

The previously described content (vol %) of the inorganic fine particles in the pressure sensitive adhesive layer was measured as follows. First, the pressure sensitive adhesive layer formed was burnt and the content (mass %) of the inorganic fine particles was measured from the obtained asn, in accordance with JIS K 7250-1: 2006. On the other hand, the true density of the used inorganic fine particles was measured in accordance with JIS Z8807: 2012. Furthermore, the density of the pressure sensitive adhesive layer, formed was measured in accordance with JIS Z8807: 2012. The content (vol %) of the inorganic fine particles in the pressure sensitive adhesive layer was calculated on the basis of the measured values thus obtained as the above of the content (mass %) of the inorganic fine particles, the true density of the inorganic fine particles, and the density of the pressure sensitive adhesive layer.

Examples 2 to 3 and Comparative Examples 1 to 5

Pressure sensitive adhesive sheets for batteries were manufactured in the same manner as in Example 1 except that the type and additive amount of the inorganic fine particles were changed as listed in Table 1. The indication "-" in Comparative Example 3 means that inorganic fine particles were not used.

<Testing Example 1> (Measurement of Mate Value and Total Luminous Transmittance)

For the pressure sensitive adhesive sheets for batteries (excluding the release sheets) obtained in Examples and Comparative Examples, the pressure sensitive adhesive layers formed in Examples and Comparative Examples, and the base materials used in Examples and Comparative Examples, the haze value (%) and the total luminous transmittance (%) were measured using a haze meter (available from NIPPON DENSHOKU INDUSTRIES CO., LTD., product name "NDH-5000"). Results for the pressure sensitive adhesive sheets for batteries and the pressure sensitive adhesive layers are listed in Table 1.

<Testing Example 2> (Measurement of Adhesive Strength)

The adhesive strength of the pressure sensitive adhesive sheets for batteries in this Testing Example was measured in accordance with JIS Z0237: 2009 except the following operation.

The pressure sensitive adhesive sheet for batteries obtained in each of Examples and Comparative Examples was cut into a width of 2.5 mm and a length of 250 mm and the release sheet was then removed to obtain a test piece.

The exposed pressure sensitive adhesive layer of the test piece was attached to an aluminum plate as an adherend using a rubber roller of 2 kg under an environment of 23° C. and 50% RH. Immediately thereafter, the test piece was peeled off from the above aluminum plate at a peel angle of 180° and a peel speed of 100 mm/min using a universal tensile tester (available from ORIENTEC Co., LTD., product name "TENSILON UTM-4-100") and the adhesive strength (N/25 mm) was thus pleasured. Results are listed in Table 1.

<Testing Example 3> (Evaluation of Suitability for Foreign Material Inspection)

The pressure sensitive adhesive sheet for batteries obtained in each of Examples and Comparative Examples was cut into a size of 20 cm×20 mm to obtain a test piece. Subsequently, the release sheet was released from one end of the test piece to partially expose the surface of the pressure sensitive adhesive layer opposite to the base material. Then, about 50 particles of white metal powder having a size of about 20 μm square as foreign materials were placed on the exposed surface of the pressure sensitive adhesive layer, and the released release sheet was thereafter attached again to the pressure sensitive adhesive layer. Then, the above-described foreign materials were visually observed from the surface of the pressure sensitive adhesive sheet for batteries on the side of the base material, and the suitability for foreign material inspection was evaluated in accordance with the following criteria. Results are listed in Table 1.

o: Foreign materials were able to be confirmed well, and the suit ability for inspection was sufficient when used in a battery.

x: Foreign materials were not able to be confirmed, and the suitability for inspection was insufficient when used in a battery.

<Testing Example 4> (Evaluation of Battery Insulation Properties)

(1) Production of Positive Electrode

A positive electrode paste was prepared by mixing 100 mass parts of $LiNi_{0.82}Co_{0.15}Al_{0.03}O_2$ as a positive electrode active material, 1.0 mass parts of acetylene black, 0.9 mass parts of polyvinylidene fluoride (binder), and an appropriate amount of NMP. Both surfaces of aluminum foil to be a positive electrode collector having a thickness of 20 μm were coated with the obtained positive electrode paste, which was dried and then rolled to produce a strip-like positive electrode having a width of 58 mm. Both surfaces near the center in the longitudinal direction of the positive electrode were provided with slit-like exposed parts exposed from one end part to the other end part of the positive electrode collector in its width direction. The width W of the exposed parts was set to 6.5 mm.

Then, a strip-like aluminum positive electrode lead having a width of 3.5 mm and a length of 68 mm was overlapped and aligned with an exposed part of the positive electrode collector so that the length of the lead-out part would be 15 mm and the length of the overlapping part would be 53 mm, and the overlapping part was welded to the exposed part.

Thereafter, the pressure sensitive adhesive sheet for batteries obtained in each of Examples and Comparative Examples was attached to the positive electrode so as to cover the entire surface of the exposed part and the entire surface of the overlapping part. At that time, the pressure sensitive adhesive sheet for batteries was made to protrude by 2 mm from both end parts in the width direction of the positive electrode so that the exposed part would be steadily covered with the pressure sensitive adhesive sheet for batteries. In addition, the pressure sensitive adhesive sheet for batteries was made to protrude by 2 mm onto the positive electrode active material layers also from both end parts in the width direction of the exposed part.

(2) Production of Negative Electrode

A negative electrode paste was prepared by mixing 100 mass parts of scale-like artificial graphite as a negative electrode active material having an average particle diameter of about 20 μm, 1 mass part of styrene butadiene rubber (SER) (binder), 1 mass part of carboxymethylcellulose (thickener), and water. Both surfaces of copper foil to be a negative electrode collector having a thickness of 8 μm were coated with the obtained negative electrode paste, which was dried and then rolled to produce a strip-like negative electrode having a width of 59 mm. Both surfaces of the end part of the negative electrode on the winding end side were provided with exposed parts exposed from one end part to the other end part of the negative electrode collector in its width direction.

Then, a strip-like nickel negative electrode lead having a width of 3 mm and a length of 40 mm was overlapped and aligned with an exposed part of the negative electrode in the same manner as in the positive electrode, and the overlapping part was welded to the exposed part.

(3) Production of Set of Electrodes

The positive electrode and negative electrode obtained above were laminated via separators and wound to form a set of electrodes. At that rime, the lead-out part of the positive electrode lead was protruded from one end surface of the set of electrodes while the lead-out part of the negative electrode lead was protruded from the other end surface.

(4) Preparation of Nonaqueous Electrolyte

A nonaqueous electrolyte was prepared by dissolving $LiPF_6$ in a mixed solvent of ethylene carbonate, ethylmethyl carbonate, and dimethyl carbonate (volume ratio of 1:1:8) to a concentration of 1.4 mol/L.

(5) Production of Battery

The set of electrodes interposed between a lower insulating ring and an upper insulating ring was housed in an iron battery case (diameter 19 mm, height 65 mm) having an inner surface plated with nickel. At that time, the negative electrode lead was made to lie between the lower insulating ring and the bottom part of the battery case. In addition, the positive electrode lead was made to pass through a through-hole at the center of the upper insulating ring. Then, an electrode rod was made to pass through a hollow part at the center of the set of electrodes and a through-hole at the center of the lower insulating ring, and one end part of the negative electrode lead was welded to the inner bottom surface of the battery case. On the other hand, one end part of the positive electrode lead pulled out from the through-hole of the upper insulating ring was welded to the inner surface of a sealing plate provided with a gasket at the peripheral part. Thereafter, a groove was formed in the vicinity of the opening of the battery case, and the nonaqueous electrolyte was poured into the battery case to impregnate the set of electrodes. Then, the opening of the battery case was closed with the sealing plate, and the opening end part of the battery case was swaged to the peripheral part of the sealing olate via the gasket to complete a cylindrical nonaqueous electrolyte secondary battery (energy density of 700 Wh/L).

(6) Execution of Forced Internal Short Circuit Test

Using the nonaqueous electrolyte secondary battery obtained above, the forced internal short circuit test for the battery was performed in accordance with JIS C8714: 2007. Nickel pieces of a standard size (height 0.2 mm, width 0.1 mm, L-shaped with a side of 1 mm, angle 90°) and a larger size (height 0.5 iron, width 0.2 mm, L-shaped with a side of 3 mm, angle 90°) than the standard size were prepared. The nickel pieces were disposed between the pressure sensitive adhesive sheet for batteries and the separators so as to penetrate the pressure sensitive adhesive sheet for batteries. Then, the forced internal short circuit test was performed to measure the rise in temperature (° C.) of the battery side surface with a thermocouple. Results are listed in Table 1.

Details of the simplified names listed in Table 1 and additional information are as follows.

<Inorganic Fine Particles>

Calcium carbonate: Calcium carbonate fine particles (available from Konoshima Chemical Co., Ltd., product name "Calcium Carbonate Light," average particle diameter: 1.1 μm, refractive index: 1.69)

Aluminum hydroxide 1: Aluminum hydroxide fine particles (available from Nippon Light Metal Co., Ltd., product name "BF013," average particle diameter: 1.2 μm, refractive index: 1.57)

Alumina: Alumina fine particles (available from Denka Company Limited, product name "ASFP-20," average particle diameter: 0.26 μm, refractive index: 1.76)

Titania: Titania fine particles (available from Sakai Chemical Industry Co., Ltd., product name "R-310," average particle diameter: 0.2 μm, refractive index: 2.64)

Aluminum hydroxide 2: Aluminum hydroxide fine particles (available from Showa Denko K.K., product name "Higilite H42," average particle diameter: 1.0 μm, refractive index: 1.57)

TABLE 1

| | | Pressure sensitive adhesive layer | | | | | |
|---|---|---|---|---|---|---|---|
| | | Inorganic fine particles | | | | | |
| | Type | Average particle diameter (μm) | Refractive index | Additive amount (mass parts) | Content in pressure sensitive adhesive layer (vol %) | Haze value (%) | Total luminous transmittance (%) |
| Example 1 | Calcium carbonate | 1.1 | 1.69 | 27.5 | 10 | 63.5 | 95.6 |
| Example 2 | Aluminum hydroxide 1 | 1.2 | 1.57 | 55 | 20 | 73.4 | 96.7 |
| Example 3 | Aluminum hydroxide 1 | 1.2 | 1.57 | 95 | 30 | 75.0 | 95.2 |

TABLE 1-continued

| | | | | | | | |
|---|---|---|---|---|---|---|---|
| Comparative Example 1 | Alumine | 0.26 | 1.76 | 90 | 20 | 86.3 | 75.8 |
| Comparative Example 2 | Titania | 0.2 | 2.64 | 100 | 20 | 99.6 | 36.5 |
| Comparative Example 3 | — | — | — | — | — | 0.5 | 99.9 |
| Comparative Example 4 | Aluminum hydroxide 1 | 1.2 | 1.57 | 500 | 70 | 95.5 | 80.0 |
| Comparative Example 5 | Aluminum hydroxide 2 | 1.0 | 1.57 | 24 | 9.8 | 45.0 | 98.0 |

| | | | | Pressure sensitive adhesive sheet for batteries | | | |
|---|---|---|---|---|---|---|---|
| | | | | | Evaluation of insulation properties (° C.) | | |
| | Haze value (%) | Total luminous transmittance (%) | Adhesive strength (N/25 mm) | Suitability for foreign material inspection | Small pieces of standard size | Small pieces of larger size | |
| Example 1 | 64.4 | 53.3 | 1.2 | ◯ | 10 | 15 | |
| Example 2 | 73.5 | 53.9 | 1.2 | ◯ | 15 | 20 | |
| Example 3 | 74.4 | 52.5 | 0.8 | ◯ | 5 | 10 | |
| Comparative Example 1 | 84.0 | 39.6 | 1.0 | X | 10 | 15 | |
| Comparative Example 2 | 99.6 | 16.0 | 1.6 | X | 15 | 20 | |
| Comparative Example 3 | 7.6 | 56.4 | 2.8 | ◯ | 36 | >100 | |
| Comparative Example 4 | 96.0 | 40.1 | 0.1 | X | 5 | 10 | |
| Comparative Example 5 | 44.1 | 55.1 | 1.5 | ◯ | 22 | >100 | |

As apparent, from Table 1, the pressure sensitive adhesive sheets for batteries of Examples have high insulation properties and it is possible to suppress the temperature rise due to the forced internal snort circuit test and well perform the foreign material inspection.

INDUSTRIAL APPLICABILITY

The pressure sensitive adhesive composition and the pressure sensitive adhesive sheet for batteries according to the present invention are suitable for use inside a lithium-ion battery and, in particular, suitable for attaching an electrode lead-out tab to an electrode.

DESCRIPTION OF REFERENCE NUMERALS

1 . . . Pressure sensitive adhesive sheet for batteries
  11 . . . Base material
  12 . . . Pressure sensitive adhesive layer
    121 . . . inorganic fine particles
  13 . . . Release sheet
2 . . . Lithium-ion battery
  21 . . . Exterior body
  22 . . . Positive electrode terminal
  23 . . . Negative electrode terminal
  24 . . . Electrode body
    241 . . . Positive electrode collector
    241a . . . Positive electrode active material layer
    242 . . . Negative electrode collector
    242a . . . Negative electrode active material layer
    243 . . . Separator
    244 . . . Electrode lead-out tab

The invention claimed is:

1. A pressure sensitive adhesive sheet for batteries, comprising:
a base material layer and a pressure sensitive adhesive layer provided on only one surface side of the base material,
the pressure sensitive adhesive layer contains inorganic fine particles,
the inorganic fine particles comprise at least one of calcium carbonate and aluminum hydroxide, and are free from alumina,
an average particle diameter of the inorganic fine particles is 0.8 μm or more and 10 μm or less,
a haze value of the pressure sensitive adhesive layer is 50% or more and 85% or less, and
a thickness of the pressure sensitive adhesive layer is 1 μm or more and 10 μm or less.

2. The pressure sensitive adhesive sheet for batteries as recited in claim 1, wherein a total luminous transmittance of the pressure sensitive adhesive layer is 80% or more.

3. The pressure sensitive adhesive sheet for batteries as recited in claim 1, wherein a content of the inorganic fine particles in the pressure sensitive adhesive layer is 1 vol % or more and 50 vol % or less with respect to the pressure sensitive adhesive layer.

4. A lithium-ion battery in which two or more conductors are fixed in a state of being in contact with each other inside the battery using a pressure sensitive adhesive sheet, wherein:
the pressure sensitive adhesive sheet comprises a base material and a pressure sensitive adhesive layer provided on only one surface side of the base material,
the pressure sensitive adhesive layer contains inorganic fine particles,
the inorganic fine particles comprise at least one of calcium carbonate and aluminum hydroxide, and are free from alumina,
an average particle diameter of the inorganic fine particles is 0.8 μm or more and 10 μm or less,
a haze value of the pressure sensitive adhesive layer is 50% or more and 85% or less, and
a thickness of the pressure sensitive adhesive layer is 1 μm or more and 10 μm or less.

5. The lithium-ion battery according to claim 4, wherein a total luminous transmittance of the pressure sensitive adhesive layer is 80% or more.

6. The lithium-ion battery according to claim 4, wherein a content of the inorganic fine particles in the pressure sensitive adhesive layer is 1 vol % or more and 50 vol % or less with respect to the pressure sensitive adhesive layer.

7. The lithium-ion battery according to claim 4, wherein the haze value of the pressure sensitive adhesive layer is 73.4% or more and 85% or less.

* * * * *